United States Patent [19]

Iida et al.

[11] Patent Number: 4,549,869

[45] Date of Patent: Oct. 29, 1985

[54] APPARATUS FOR OPERATING AN OUTBOARD MOTOR

[75] Inventors: Kazumi Iida, Iwata; Kenji Ikeda, Hamamatsu, both of Japan

[73] Assignees: Yamaha Hatsudoki Kabushiki Kaisha, Iwata; Sanshin Kogyo Kabushiki Kaisha, Hamamatsu, both of Japan

[21] Appl. No.: 474,024

[22] Filed: Mar. 10, 1983

[30] Foreign Application Priority Data

Mar. 18, 1982 [JP] Japan .................................. 57-41663

[51] Int. Cl.4 ................................................ B60K 21/00

[52] U.S. Cl. ........................................ 440/84; 440/53; 440/63; 440/86; 440/87

[58] Field of Search ........................ 440/84, 85, 86, 87, 440/53, 63, 64, 900; 74/480 B, 506, 879, DIG. 8, 471; 192/0.096, 0.098; 114/144 R, 146

[56] References Cited

U.S. PATENT DOCUMENTS

| | | | |
|---|---|---|---|
| 2,590,820 | 3/1952 | Jedlicka | 74/480 B |
| 2,682,248 | 6/1954 | Sitz | 440/87 |
| 2,948,163 | 8/1960 | Stone | 74/471 |
| 3,330,390 | 7/1967 | Kobelt | 192/0.096 |
| 3,636,911 | 1/1972 | Piazza | 440/87 |
| 3,640,155 | 2/1972 | Waner | 192/0.098 |
| 3,820,641 | 6/1974 | Borst | 192/0.098 |
| 4,231,315 | 11/1980 | Bland | 74/506 |

FOREIGN PATENT DOCUMENTS

| | | | |
|---|---|---|---|
| 940561 | 10/1963 | United Kingdom | 74/480 R |
| 713769 | 2/1980 | U.S.S.R. | 440/86 |

*Primary Examiner*—Trygve M. Blix
*Assistant Examiner*—C. T. Bartz
*Attorney, Agent, or Firm*—Ernest A. Beutler

[57] ABSTRACT

An outboard motor having an improved shifting and throttle control arrangement wherein the operating handle is moved in a forward direction to engage the forward gear of the transmission and in a rearward direction to engage the reverse gear of the transmission so as to avoid the likelihood of incorrect shifting.

4 Claims, 6 Drawing Figures

APPARATUS FOR OPERATING AN OUTBOARD MOTOR

BACKGROUND OF THE INVENTION

This invention relates to an apparatus for operating outboard motors and more particularly to an improved shift and throttle control for such motors.

It is common practice in connection with outboard motors to provide a control handle on the steering tiller that is operative to control both the transmission mechanism and the throttle control of the engine. Although such an arrangement obviously provides convenience, it can also offer certain disadvantages. Frequently, the operator may be unfamiliar with the mechanism and may rotate the operating handle in a direction so as to select the improper gear. If the handle is further rotated so as to open the throttle, it can result in high speed travel in the wrong direction.

It is, therefore, a principal object of this invention to provide an improved, simplified and foolproof arrangement for controlling the operation of an outboard motor.

It is another object of this invention to provide an improved shifting arrangement for an outboard motor wherein the control handle is moved in the same direction as the selected direction of propulsion.

SUMMARY OF THE INVENTION

This invention is adapted to be embodied in a control apparatus for an outboard motor or the like having a throttle and a forward/reverse transmission. The control apparatus comprises a tiller carried by the motor for steering of the motor and an operating handle that is carried by the tiller and which is operatively connected to the throttle and to the transmission for controlling the speed and the shifting. In accordance with this feature of the invention, the operating handle is constructed and arrangement for movement in a forward direction to effect forward drive and for movement in a rearward direction so as to effect reverse drive.

DETAILED DESCRIPTION OF THE PREFERRED EMBODIMENT

Figure 1:
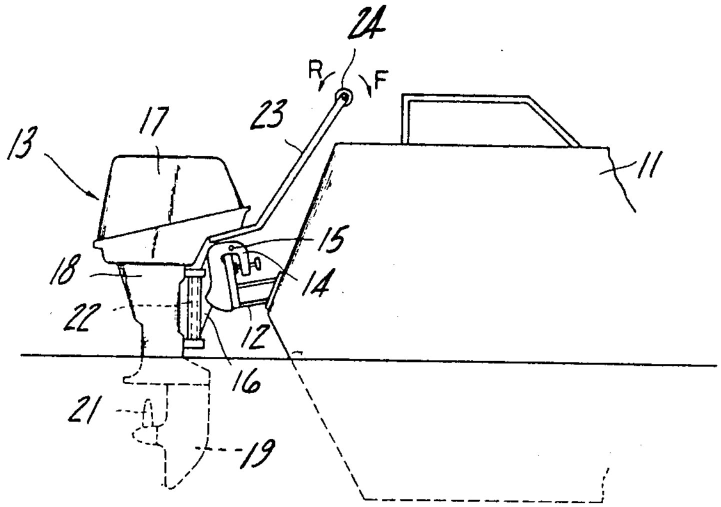
FIG. 1 is a side elevational view of the rear portion of a watercraft and propelling outboard motor constructed in accordance with an embodiment of the invention.
Figure 2:
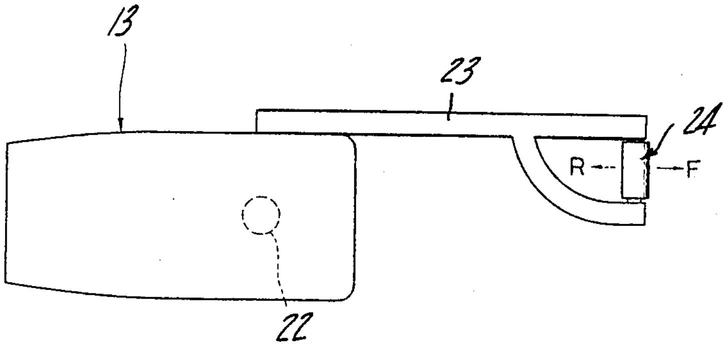
FIG. 2 is an enlarged top plan view of the outboard motor.
Figure 3:
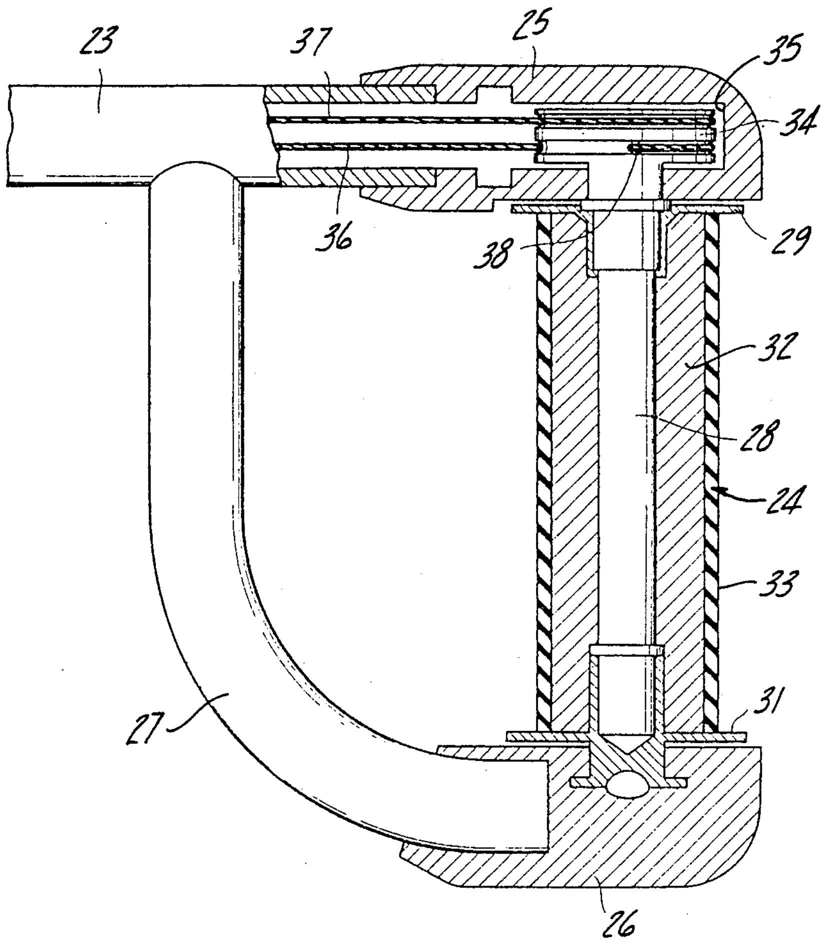
FIG. 3 is a further enlarged top plan view, with portions shown in section, of the controlling mechanism constructed in accordance with the invention.

Referring first to FIG. 1, a boat 11 has an outrigger 12 affixed in a suitable manner to its transom. An outboard motor constructed in accordance with this invention is identified generally by the reference numeral 13 and includes a clamp bracket 14 that permits attachment of the motor 13 to the outrigger 12. A swivel bracket 16 is pivotally supported by the clamp bracket 14 by means of a pivot pin 15 so as to permit tilting and trim movement of the motor about a horizontally disposed axis relative to the clamp bracket 14.

The motor 13 includes a power head 17 that incorporates an internal combustion engine of a known type, a drive shaft housing 18 through which a drive shaft driven by the engine of the power head extends and a lower unit 19 in which a propeller 21 is supported for rotation. As will become apparent, the propeller 21 is driven from the engine drive shaft by means of a forward/neutral/reverse transmission. The power head 17, drive shaft housing 18 and lower unit 19 are journalled for steering movement about a generally vertically extending steering axis on the swivel bracket 16 by means of a steering shaft 22 in a known manner. A tiller 23 in the form of an elongated handle is affixed to the power head 17 for steering of the motor 13 about the steering axis in a known manner.

A control handle assembly, indicated generally by the reference numeral 24, is provided at the forward end of the tiller 23 for controlling both the speed of the engine and also the shifting of the transmission within the lower unit 19. Unlike the prior art arrangements, the control handle 24 is supported for rotation about an axis that extends tranversely to the normal direction of travel of the boat 11. The reason for this will become apparent as this description proceeds.

A first bearing member 25 is supported at the forward end of the tiller 23. A second bearing member 26 is supported in spaced relationship to the bearing member 25 by means of an offset arm 27 that is affixed to the forward end of the tiller 23. A shaft assembly 28 is rotatably journalled in the bearing portions 25 and 26. The pair of flange members 29, 31 are affixed to the shaft assembly 28 in proximity to the bearings 25 and 26. An annular core 32 surrounds the shaft assembly 28 between the flanges 29 and 31 and is, in turn, surrounded by a rubber grip 33 that is adapted to be encircled by an operator's hand. The grip 33, core 32 and shaft assembly 28 may be rotated in unison.

Rotation of the handle assembly 24 is operative to change the speed of the engine and also to operate its transmission. For this purpose, a pulley 34 is affixed to one end of the shaft assembly 28 and extends into a recess 35 formed in the bearing 25. A pair of flexible transmitters 36 and 37 have their opposite ends affixed to the pulley 34 by means of connectors 38 and 39, respectively. The transmitters 36 and 37 are wound in opposite directions around the pulley 34.

Figure 4:
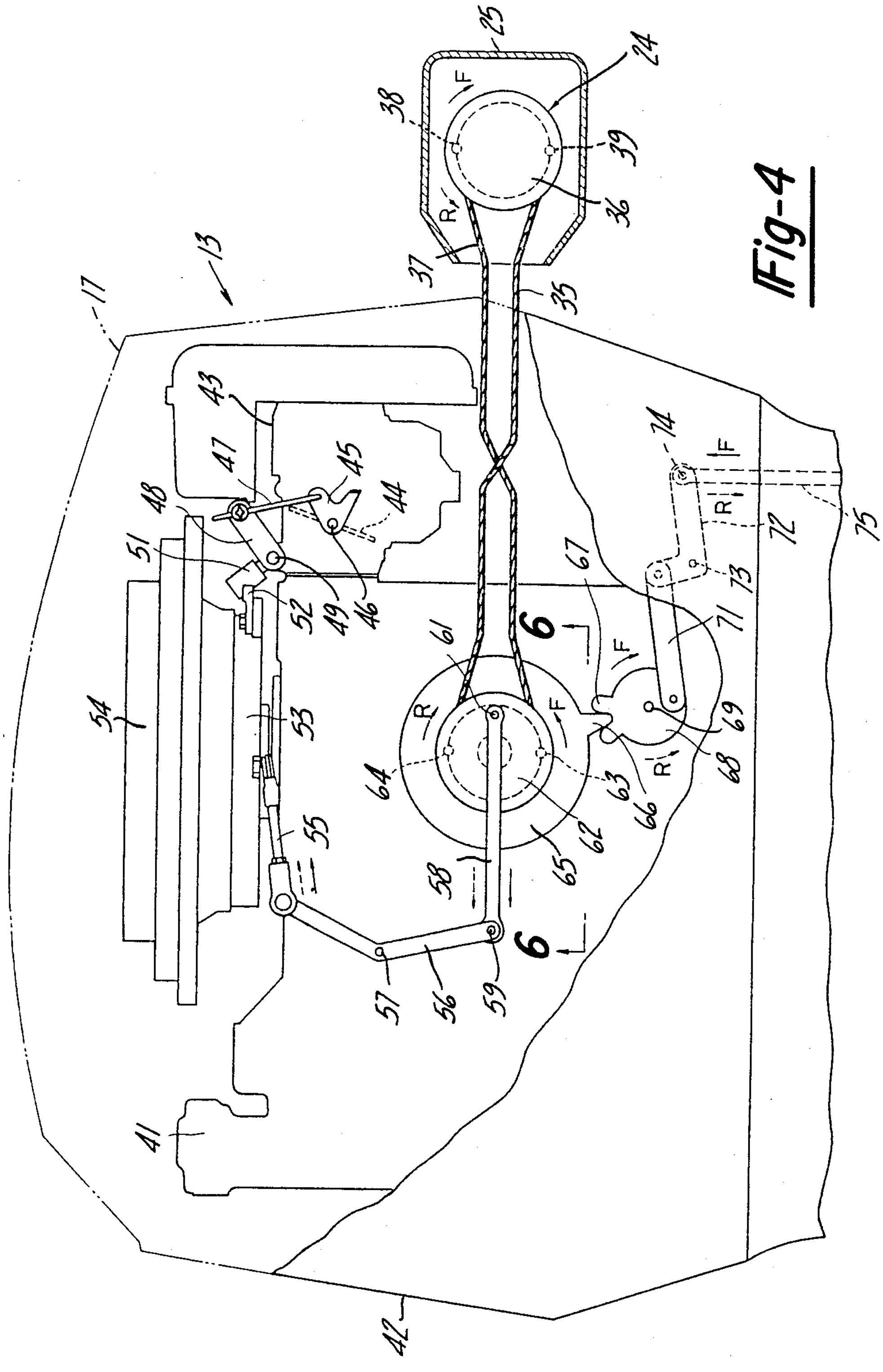
FIG. 4 is a partially schematic side elevational view, with portions broken away and other portions shown in section, of the interconnection of the controlling handle to the throttle and transmission.

Referring now additionally and primarily to FIG. 4, the internal details of the power head 17 are shown. An internal combustion engine, indicated generally at 41 is provided in an outer protective cowling 42 of the power head 17. The engine 41 may be of any known type and includes a carburetor 43 having a throttle valve 44 that is rotated so as to control the speed of the engine 41. For this purpose, a bellcrank 45 is affixed to a throttle valve shaft 46 and is operatively connected to a link 47. The link 47 is, in turn, pivotally connected at its opposte end to a lever 48 which is, in turn, pivotally supported by a shaft 49. A roller follower 51 is affixed to the shaft 49 and is engaged with a cam 52 for operation of the throttle valve 44.

The cam 52 is affixed to a base plate 53 of a flywheel magneto assembly 54. The base plate 53 is rotated by means of a link 55 that is pivotally connected at one end to the base plate 53 and at its other end to a bellcrank 56 that is pivotally supported on a side of the engine by means of a pivot pin 57. The other bellcrank arm is connected to one end of a link 58 by means of a pivot pin 59. The opposite end of the link 58 is connected by a pivot pin 61 to a pulley 62 that is journalled in a suitable manner on the side of the engine 41. The ends of the flexible transmitters 36, 37 are affixed to the pulley 62 by means of connectors 63, 64.

A shifting drum 65 is affixed for simultaneous rotation with the pulley 62 and has a lug 66 extending from one side thereof. The lug 66 is normally received in a recess defined by a pair of projections 67 of a shifting cam 68. The cam 68 is journalled on the side of the engine 41 by means of a pivot shaft 69. A link 71 has one end pivotally connected to the shifting cam 66 and its other end pivotally connected to one arm of a bellcrank 72. The bellcrank 72 is also pivotally supported on the side of the engine 41 by means of a pivot pin 73.

Figure 5:
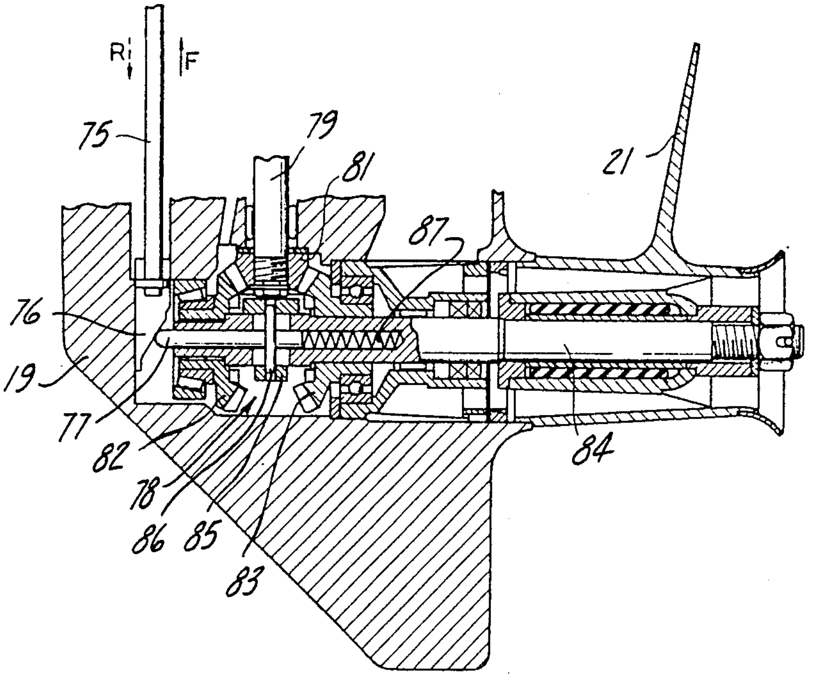
FIG. 5 is a cross-sectional view showing the transmission of the outboard motor.
Figure 6:
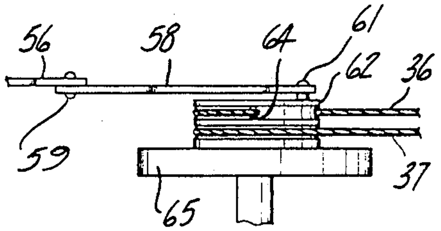
FIG. 6 is a cross-sectional view, taken along the line 6—6 of FIG. 4.

The other arm of the bellcrank 72 is connected by a pivot pin 74 to the upper end of a shift rod 75. As seen in FIG. 5, the shift rod 75 extends down through the drive shaft housing 18 and into the lower unit 19. The lower end of the shift rod 75 carries a shift cam 76 that cooperates with a plunger 77 to operate a forward/neutral/reverse transmission, indicated generally by the reference numeral 78 and now to be described.

The transmission 78 is of the normal type employed with outboard motors and includes a drive shaft 79 that is driven by the engine 41 and which extends through the drive shaft housing 18 and terminates in the lower unit 9. A driving bevel gear 81 is affixed to the lower end of the drive shaft 79 and meshes with a forward bevel gear 82 and a reverse bevel gear 83 that is journalled in a suitable manner on a propeller shaft 84. Because of the arrangement of the bevel gears 81, 82 and 83, rotation of the drive shaft 79 will cause the bevel gears 82 and 83 to be driven in opposite directions.

A dog clutch element 85 is interposed between the bevel gears 82 and 83 and is supported for axial movement relative to the propeller shaft 84 but is keyed so that it will drive the propeller shaft 84. A pin 86 connects the dog clutch element 85 to the plunger 77 so that axial movement of the plunger 77 will effect engagement of the clutch element 85 with either the gears 82 or 83. A coil compression spring 87 is engaged with the inner end of the plunger 77 so as to normally urge it into engagement with the shift cam 76.

The propeller 21 is affixed to the propeller shaft 84 and is driven by the propeller shaft 84 in a known manner.

OPERATION

The figures of the drawings illustrate the outboard motor as it appears when the transmission 78 is in its neutral condition and the engine 41 is idling. In this condition, the handle 24 is at a neutral position and the pulley 62 and drum 65 are also in a neutral position. It should be noted that the link 58 is positioned so that its pivot pin 61 lies in line with the rotational axis of the pulley 62. In this position, the throttle valve 44 is in its idle condition and the lug 66 is received in the groove defined by the projection 67 so that the shift rod 75 will be maintained in a neutral position and the dog clutch element 85 will be positioned out of engagement with the gears 82 and 83. Hence, the engine 41 will operate at idle and the propeller shaft 84 will not be driven.

If the operator of the boat 11 wishes to shift the transmission 78 into forward and accelerate the engine 41, he grips the handle 24 and rotates it in a forward direction as indicated by the arrow F in the figures. Hence, to shift into forward, the operator merely shifts the handle in the direction he wishes the boat to travel, thus avoiding the likelihood of inadvertent shifting into the wrong gear.

When the handle 24 is rotated in the forward direction (F), a tension will be placed on the cable 37. This will cause the pulley 62 to be rotated in a counterclockwise direction as also indicated by the arrow F. Counterclockwise rotation of the pulley 62 causes the drum 65 also to rotate in a counterclockwise direction and rotate the shift cam 68 in a clockwise direction. Clockwise rotation of the shift cam 68 effects a pull on the link 71 so as to rotate the bellcrank 72 in a counterclockwise direction and draw the shift rod 75 upwardly. Upward movement of the shift rod 75 causes the cam 76 to move upwardly and the spring 87 will urge the plunger 77 to the left so as to cause the dog clutch 85 to move into engagement with the clutching jaws on the forward driven bevel gear 82. The propeller shaft 84 and propeller 21 will then be driven in a forward direction.

When the pulley 62 is rotated in a counterclockwise direction, the link 58 will be driven rearwardly as it passes in an overcenter condition so as to rotate the bellcrank 56 in a clockwise direction which, in turn, rotates the drum 53 and attached cam 52 so as to open the throttle valve 44.

If the operator wishes to shift from neutral to reverse, he grips the handle 24 and rotates it in a rearward direction, corresponding to the direction he wishes the boat 11 to travel. When this occurs, a tension will be placed on the cable 36 so as to rotate the pulley 62 in a clockwise direction as indicated by the arrows R. When this occurs, the cam 68 will be rotated in a counterclockwise direction and a pressure will be placed on the link 71 so as to rotate the bellcrank 72 in a clockwise direction. This causes the shift rod 75 and attached cam 76 to be forced downwardly. Downward movement of the cam 76 effects movement of the plunger 77 to the right so that the dog clutch 85 will be moved into engagement with the associated clutching teeth on the reverse driven bevel gear 83. The propeller shaft 84 and propeller 88 will then be rotated in a reverse direction.

When the pulley 62 is rotated in a clockwise direction, the link 58 will again be urged rearwardly due to its overcenter condition when the engine is in neutral and idling. Hence, the throttle valve 44 will again be opened when the handle 24 is rotated in the reverse direction as indicated by the arrow R.

It should be readily apparent from the foregoing description that a very simple and highly effective shifting arrangement has been provided wherein the operator of a watercraft need merely rotate the operating handle in the direction he wishes the boat to travel so as to engage the appropriate transmission gear and appropriately open the throttle.

Although a rotary handle is described, the invention can also be employed with an arrangement wherein a lever is utilized to effect the shifting and the throttle operation as long as the lever is moved in a forward direction to engage the forward gears of the transmission and in a rearward direction to engage the rearward gears of the transmission. Various other changes and modifications may be made without departing from the spirit and scope of the invention, as defined by the appended claims.

We claim:

1. A control apparatus for an outboard motor or the like having a throttle and a forward/reverse transmission comprising a tiller carried by said motor for steering thereof and extending forwardly from said motor and an operating handle carried by said tiller and operatively connected to said throttle and to said transmission for controlling speed and shifting, the improvement comprising said operating handle being supported on said tiller about an axis extending at a right angle to said tiller for rotational movement relative to said tiller about said axis for rotational movement in a forward direction to effect engagement of a forward gear of the transmission and in a rearward direction to effect engagement of a reverse gear of the transmission and means for opening of the throttle regardless of which direction said operating handle is rotated upon continued rotation of the operating handle past the position wherein the respective gear of the transmission is engaged.

2. A control apparatus as set forth in claim 1 wherein the operating handle is operatively connected to rotate a drum having a cam thereon for operating the transmission and a link pivotally connected thereto along a diameter thereof which link is operatively connected to the throttle valve for operating the link regardless of which direction the drum is rotated.

3. A control apparatus as set forth in claim 1 further including flexible transmitter means operatively connected to the operating handle and extending through the tiller for operating the throttle and transmission control.

4. A control apparatus as set forth in claim 3 wherein the flexible transmitter is operatively connected at its other end to a drum journaled on the engine of the outboard motor and having a cam thereon for operating the transmission and a link pivotally connected thereto along a diameter of said drum and which link is operatively connected to the throttle for operating the throttle regardless of the direction of rotation of said drum.

* * * * *